Oct. 22, 1968    M. S. DECKER, JR., ET AL    3,406,991
FLANGE AND BACKUP RING FOR A CONDUIT JOINT
Filed April 24, 1967

INVENTORS
MAURICE S. DECKER JR.
HARTWEL R. HILLIER
BY

ATTORNEY

United States Patent Office 3,406,991
Patented Oct. 22, 1968

3,406,991
FLANGE AND BACKUP RING FOR
A CONDUIT JOINT
Maurice S. Decker, Jr., Columbus, and Hartwell R. Hillier,
Westerville, Ohio, assignors to Midland-Ross Corporation, Toledo, Ohio, a corporation of Ohio
Filed Apr. 24, 1967, Ser. No. 633,285
3 Claims. (Cl. 285—408)

ABSTRACT OF THE DISCLOSURE

This invention relates to an improved conduit joint of the type wherein spaced flanges are directed toward one another to create a seal by the engagement of the flange faces. The conduit joint of this invention is provided with a pair of backup rings, one placed behind each of the flanges, that control the manner of engagement of the flange faces. An actuator ring of a coupling engages and acts on each of the backup rings. As the backup rings are urged toward one another, as by the actuator ring a biasing force is directed toward the base of the flanges through the backup rings and assures intimate contact along the entire sealing surfaces. A small, spacing is provided between the backup ring and its associated flange to control the direction of the force applied from the actuator ring to the flanges. An additional advantage of this construction is that the flanges may be made of one material and the backup rings of another, thus taking advantage of the properties of these two different materials while still achieving an effective seal.

Background

In order to sealingly connect adjacent ends of a pair of aligned conduits, a conduit joint is usually provided having a pair of opposed flanges that engage one another through the urging of a coupling. Examples of conduit joints are shown in U.S. Patents 2,675,253 (B. Stade), 2,756,079 (A. D. Herman) and 2,841,420 (T. A. Woolsey et al.). One of the recurring problems associated with this type of conduit joint is the tendency of the flanges to meet at their radially outermost portions instead of the flange faces abutting along their entire mating surfaces. Increased tightening of the constrictor band merely increases the pressure at the point of contact without significantly increasing the area of abutment. This type of seal is particularly not desirable with the increased requirements for conduits of increasing diameters which must contain fluids having increasingly higher pressures. In addition to the increased requirements for pressure, the temperature requirements have also increased to a point where the lightweight materials of construction, such as aluminum, are unable to withstand conditions imposed as the fluid is conveyed through the conduits. Consequently, industry has resorted to materials, such as titanium, that have high strength and high temperature properties.

The chief disadvantage of using titanium is that of expense, particularly in the fabrication on solid flanges. To produce a solid flange, a member is first forged and then machined and a high amount of material is used. In addition, losses are realized from the machining of the flanges. It would obviously be an advantage to have a conduit joint able to effectively seal high pressure, high temperature fluid without the attendant shortcomings heretofore cited.

Objects

It is, therefore, an object of this invention to provide a flange joint that has intimate contact along the entire radial lengths of the flange faces.

It is another object of this invention to provide a flange joint made of an expensive material wherein the use of this expensive material is kept at a minimum.

It is still another object of this invention to provide a composite flange joint wherein the physical properties of the different materials are advantageously used.

It is a further object of this invention to provide a conduit joint wherein the force urging the flange faces together is directed to the base of the flange.

It is a still further object of this invention to provide a backup ring between the flanges and coupling of a conduit joint.

Detailed Description

Figure 1:
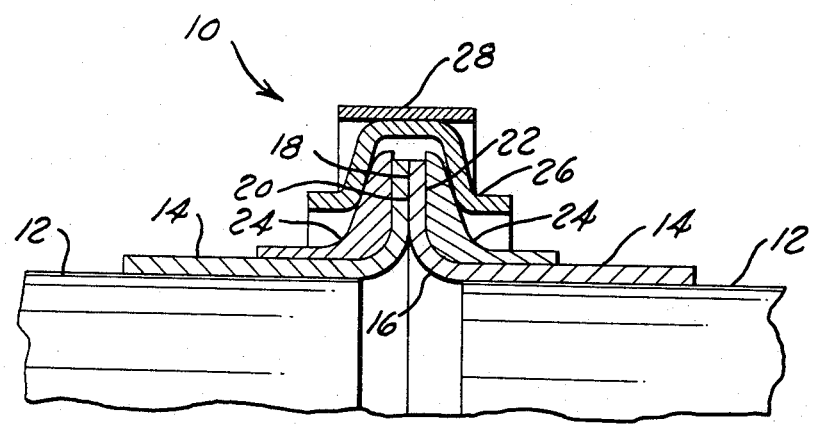
FIG. 1 is a longitudinal view, in section, of a portion of a pair of conduit lines having their adjacent ends sealingly joined by a joint that is made in accordance with this invention.

Referring now to the drawing, a conduit joint is shown generally at 10 that sealingly connects aligned ends 12 of a pair of conduits. Secured to each end 12 of the conduit, as by welding, is a flange member 14. This flange member 14 has a heel 16 and an abutting member 18 that has a pair of faces, a front face 20 and a back face 22. Circumposing each flange 14 at the heel 16 and back face 22 thereof is a backup ring 24. Engaging each back side of the backup rings 24 is a V-band coupling comprising an annular actuating member 26 about which a constricting band 28 is located. The constricting band 28 has a diameter that may be varied by a takeup and latching mechanism (not shown). Although this particular embodiment employs a V-band coupling, any of the well known couplings may be used in the practice of this invention.

Figure 2:
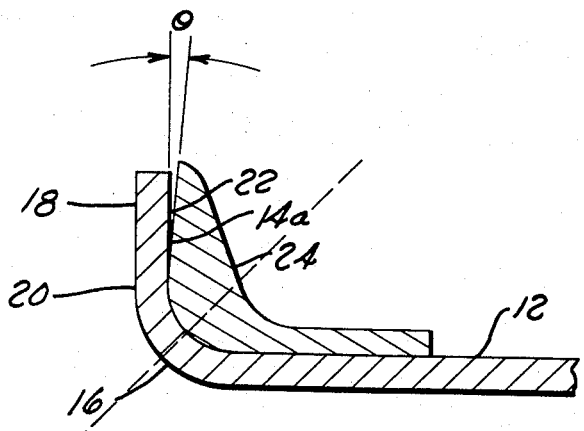
FIG. 2 is a longitudinal view, in section, of a portion of another conduit end with a backup ring thereon before being lightened against an associated conduit end.

In the preferred embodiment of this invention, a space is initially provided between the backup ring 24 and the back face 22 of the abutting member 20, as can be seen in FIG. 2. The abutting members 18 extend normal relative to the axis of the conduit 12 while the backup ring tilts from the heel 16 at an angle $\theta$ between 0° and 20°, the preferable angle being 5°, thereby forming an inclined plane.

As the constrictor band 28 is tightened, the actuating member 26 is urged downwardly against the backup rings 24, thus tending to bias them toward one another. The backup rings 24 in turn contact the flanges at the back face 22 and the presence of the inclined plane creates a combination radial-axial force on the flanges. The direction of force exerted on the backup ring 24 is indicated by the dotted line in FIG. 2 and passes through the heel 16 of the flange 14. In this way, the biasing of the flange faces 20 toward one another is accomplished from the inner radial end toward the outer radial end. As the actuating member is further urged against the backup ring, the magnitude of the angle $\theta$ decreases until full contact is made between the backup rings 24 and the faces 22. This combination enables the force to maintain an abutting relationship along the entire length of the faces 20 with the initial force being directed at the heel and then spreading over the entire abutting member 18. This is a more effective combination than the prior art solid flanges which tended to tip inwardly under the combined loading of the coupling and the parting forces due to internal pressure and bending movement.

It will be noticed that the flange member 14 of FIG. 1 is a relatively thin member to be of the solid flange type. This small thickness is made possible through the use of the backup ring 24, since the flange 14 does not receive the force of the actuating ring directly. Although the flange 14 and the backup ring may be made of the same material, in some instances it may be advantageous to use different materials. For example, the flange 14 may be made of titanium by flaring the end of a titanium tube to form the sealing portion 18, and the backup ring may be made of a material other than titanium, such as aluminum or stainless steel, which is able to mate with the titanium to provide the proper biasing force on the face surfaces 20. It is obvious that this is a more inexpensive method of producing a conduit joint that requires the use of a titanium, or other material having high temperature properties, since only a small amount of the titanium is used and there is no loss as is usually experienced in forging and machining.

Figure 3:
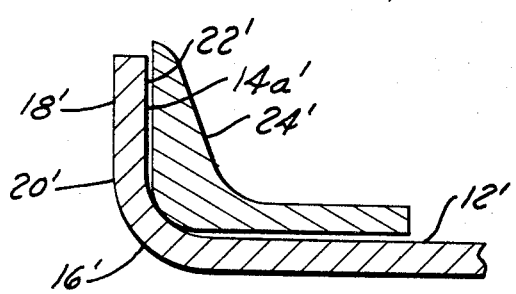
FIG. 3 is a view, similar to FIG. 2, of another embodiment of this invention.

The conduit end 12 shown in FIG. 2 is somewhat different than the one shown in FIG. 1. The conduit end 12 in FIG. 2 is flared to form the flange member 14a, instead of the flange being a separate member that is attached thereto. In FIG. 3, another method is shown for obtaining a spacing between the flange member and the backup ring by providing the backup ring with a different radius from that of the flange. The radius of the backup ring 24' is smaller than the radius of the flange 14a', that is, the angular distance from the axially disposed surface to the radially disposed surface is less for the ring than this distance is for the flange. When the biasing means acts upon the backup ring 24' to urge it against the flange 14a', the surfaces will engage one another from the heel 16' radially outwardly. Thus another method is shown whereby the faces 20' of the flange may be biased together without having the outer ends engaging first.

The embodiment described and shown in FIG. 1 provided a seal by the abutting relationship of the faces 20 of the flange member 14. This seal may also be accomplished by placing a gasket, seal ring or other appropriate member between the flat faces without departing from the principles of this invention.

Although only a few embodiments of this invention have been shown and described, it is understood that changes and modifications can be made therein, and this description is illustrative only and not for the purpose of rendering this invention limited to the details illustrated or described except insofar as they are limited by the terms of the following claims.

We claim:

1. A conduit joint of the type that sealingly joins adjacent ends of tubular conduits comprising: a pair of solid annular flange members each secured to an adjacent end of the tubular conduits, said flanges having curvilinear heel portions extending from axial portions to generally radially extending planar, annular faces spaced relative to one another, a pair of annular backup rings each circumposing a tubular conduit adjacent the back side of each flange, said backup rings having a curvilinear surface that conforms generally with the curvilinear surface of the flange and contacts the outside diameter of each flange heel and having a generally radially extending portion spaced from the back side of each flange, and means for biasing said backup rings toward one another whereby a force is imparted generally toward the heel of each flange to facially engage said faces with one another, thereby sealing the adjacent tubular coupling ends.

2. The conduit joint of claim 1 wherein the generally radially extending portion of said backup rings extend from the flange heels at an angle between 0° and 20° relative to the backside of said flange.

3. The conduit joint of claim 1 wherein said curvilinear surface of said backup rings has a smaller radius than the curvilinear surface of the flanges.

References Cited

UNITED STATES PATENTS

| | | | |
|---|---|---|---|
| 269,597 | 12/1882 | Pope | 285—384 |
| 675,335 | 5/1901 | Luke | 285—384 |
| 986,506 | 3/1911 | Sargent | 285—412 |
| 2,613,958 | 10/1952 | Richardson | 285—353 |
| 2,955,847 | 10/1960 | McKenna | 285—291 |
| 3,144,264 | 8/1964 | Lewis et al. | 285—367 |
| 3,301,577 | 1/1967 | Latham | 285—329 |

FOREIGN PATENTS

| | | |
|---|---|---|
| 165,925 | 6/1921 | Great Britain. |
| 359,575 | 2/1962 | Switzerland. |

CARL W. TOMLIN, *Primary Examiner.*

WAYNE L. SHEDD, *Assistant Examiner.*